United States Patent
Gabilondo

(10) Patent No.: US 11,759,885 B2
(45) Date of Patent: Sep. 19, 2023

(54) METHODS AND SYSTEMS FOR OPERATING A MACHINE IN A MANUFACTURING PROCESS

(71) Applicant: ETXE-TAR, S.A., Elgoibar (ES)

(72) Inventor: Jose Juan Gabilondo, Elgoibar (ES)

(73) Assignee: ETXE-TAR, S.A., Elgoibar (ES)

( * ) Notice: Subject to any disclaimer, the term of this patent is extended or adjusted under 35 U.S.C. 154(b) by 136 days.

(21) Appl. No.: 17/312,688

(22) PCT Filed: Dec. 19, 2019

(86) PCT No.: PCT/EP2019/086390
§ 371 (c)(1),
(2) Date: Jun. 10, 2021

(87) PCT Pub. No.: WO2020/127791
PCT Pub. Date: Jun. 25, 2020

(65) Prior Publication Data
US 2022/0063016 A1    Mar. 3, 2022

(30) Foreign Application Priority Data
Dec. 20, 2018    (EP) .................................... 18382961

(51) Int. Cl.
*B23K 26/06*    (2014.01)
*G05B 19/4097*    (2006.01)

(52) U.S. Cl.
CPC ...... *B23K 26/0626* (2013.01); *G05B 19/4097* (2013.01); *G05B 2219/35134* (2013.01)

(58) Field of Classification Search
CPC ............ B23K 26/0626; G05B 19/4097; G05B 2219/35134; G05B 2219/45165;
(Continued)

(56) References Cited

U.S. PATENT DOCUMENTS 6,278,079 B1 * 8/2001 McIntyre .................. A61F 2/07
                                                                600/36
9,235,205 B2 * 1/2016 Prestidge ............. G05B 19/401
(Continued)

FOREIGN PATENT DOCUMENTS

WO    2014037281 A2    3/2014
WO    2016026706 A1    2/2016
WO    2017177070 A1    10/2017

OTHER PUBLICATIONS

Gerhard Witjes et al., "Der Direkte Weg", Form + Werkzeug, Hanser Fachzeitschriften, Mar. 1, 1996, No. 1, p. 32-35, XP000591236.
(Continued)

*Primary Examiner* — Thomas C Lee
*Assistant Examiner* — Tyler Dean Hedrick
(74) *Attorney, Agent, or Firm* — CANTOR COLBURN LLP

(57) ABSTRACT

Methods and systems for operating a machine, the machine includes moveable axes and an apparatus for emitting an energy beam. A method includes the steps of providing a computing device or system; providing, the computing device or system, a program for operating the axes of the machine based on a CAD file, the program having a plurality of controller instructions for operating the axes; and providing the program to a controller of the machine. The computing device or system adds apparatus instructions to the program, each apparatus instruction corresponding to an energy beam radiation configuration of energy beam radiation configurations for the apparatus. Each time the controller runs a line of the program that has an apparatus instruction, the computing device or system operates the apparatus according to the apparatus instruction; and each apparatus instruction added to the program is a comment for the controller.

20 Claims, 7 Drawing Sheets

```
N1 G90 ;ABSOLUTE COORDINATES
N2 G54 ;ZERO COORDINATES PIECE
N3 G642 EEWON SOFT ;CONTINOUS PATH MODE AND SOFT ACCELERATION
N4 G1 X=0.00000 Y= -40.00000 Z=30.00001 F=1000.0
N5 ;RAIO: <tool_path id="PATH1" process_power="4000.0" v="850.0">
N6 WHEN TRUE DO M66
N7 ;RAIO: <tool_change id="T1_Pentagon_45mm" power_ratio="1" />
N8 ;AXIS MODE: 3 AXIS TOOLPATH
N9 WHEN TRUE DO M10
N10 X=0.00000 Y= 40.81471 Z=30.00001 F=10.518
N11 WHEN TRUE DO M66
N12 ;RAIO: <tool_change id="T1_Pentagon_60mm" power_ratio="1.0" />
N13 X=0.00000 Y= 95.78038 Z=30.00001 F=15.464
N14 WHEN TRUE DO M66
N15 ;RAIO: <tool_change id="T1_Pentagon_15mm" power_ratio="0.4" />
N16 X=0.00000 Y= 170.00000 Z=30.00001 F=11.452
N17 WHEN TRUE DO M66
N18 WHEN TRUE DO M11
N19 ;RAIO: </tool_path>
N20 WHEN TRUE DO M67
N21 M30
```

(58) Field of Classification Search
CPC ........... G05B 2219/49353; G05B 2219/49371; Y02P 90/02
See application file for complete search history.

(56) References Cited

U.S. PATENT DOCUMENTS

| | | | |
|---|---|---|---|
| 9,399,264 B2 | 7/2016 | Stecker | |
| 2006/0178770 A1* | 8/2006 | Egawa | G05B 19/4103 700/166 |
| 2006/0267992 A1* | 11/2006 | Kelley | G06F 9/3885 712/E9.05 |
| 2007/0005178 A1 | 1/2007 | Prestidge et al. | |
| 2015/0211083 A1* | 7/2015 | Gabilondo | F16C 41/008 219/121.73 |
| 2018/0150058 A1 | 5/2018 | Shapiro | |
| 2018/0214985 A1* | 8/2018 | Victor | B29C 64/268 |

OTHER PUBLICATIONS

International Search Report dated Jan. 30, 2020 re: Application No. PCT/EP2019/086390, pp. 1-3, citing: US 2018/150058 A1, US 2007/005178 A1 and Witjes et al. "Der Direkte Weg".
Written Opinion dated Jan. 30, 2020 re: Application No. PCT/EP2019/086390, pp. 1-3, citing: US 2018/150058 A1, US 2007/005178 A1 and Witjes et al. "Der Direkte Weg".
Indian Office Action dated Jan. 3, 2023 for Indian Application No. 202137026676, 5 pages.

* cited by examiner

```
N1  G90 ;ABSOLUTE COORDINATES
N2  G54 ;ZERO COORDINATES PIECE
N3  G642 EEWON SOFT ;CONTINOUS PATH MODE AND SOFT ACCELERATION
N4  G1 X=0.00000 Y= -40.00000 Z=30.00001 F=1000.0
N5  ;RAIO: <tool_path id="PATH1" process_power="4000.0" v="850.0">
N6  WHEN TRUE DO M66
N7  ;RAIO: <tool_change id="T1_Pentagon_45mm" power_ratio="1" />
N8  ;AXIS MODE: 3 AXIS TOOLPATH
N9  WHEN TRUE DO M10
N10 X=0.00000 Y= 40.81471 Z=30.00001 F=10.518
N11 WHEN TRUE DO M66
N12 ;RAIO: <tool_change id="T1_Pentagon_60mm" power_ratio="1.0" />
N13 X=0.00000 Y= 95.78038 Z=30.00001 F=15.464
N14 WHEN TRUE DO M66
N15 ;RAIO: <tool_change id="T1_Pentagon_15mm" power_ratio="0.4" />
N16 X=0.00000 Y= 170.00000 Z=30.00001 F=11.452
N17 WHEN TRUE DO M66
N18 WHEN TRUE DO M11
N19 ;RAIO: </tool_path>
N20 WHEN TRUE DO M67
N21 M30
```

FIG. 6

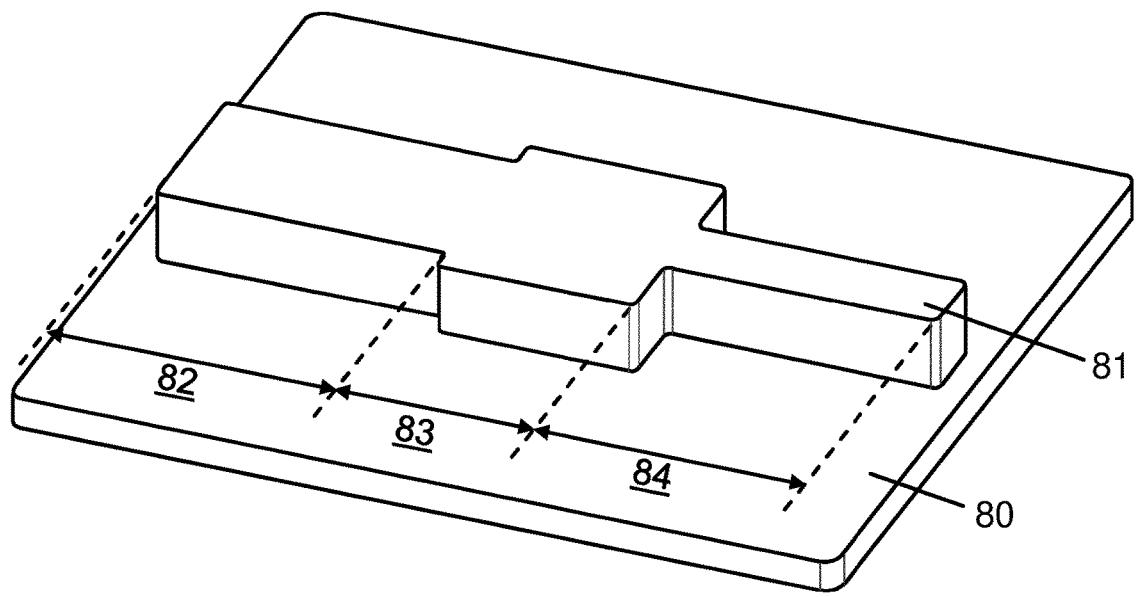

FIG. 7

METHODS AND SYSTEMS FOR OPERATING A MACHINE IN A MANUFACTURING PROCESS

TECHNICAL FIELD

The present disclosure relates to manufacturing processes, and more specifically it relates to the control and operation of a machine in a manufacturing process.

BACKGROUND

Manufacturing processes are long known and have been the target of many improvements. One of the most important advances in this field has been the introduction of computer-aided manufacturing (CAM) software. With the use of CAM software, the manufacturing processes have become faster, safer, more accurate and more cost-effective.

The CAM software processes a computer-aided design (CAD) file in accordance with a manufacturing process definition. Then, a post-processor takes the output of the CAM software and provides a program for a controller like a numerical control so that it may operate a particular machine; the post-processor provides the program with instructions corresponding to the particular machine. With the program of the post-processor, a computer numerical control (CNC) apparatus or machine is operated so as to process a workpiece with different tools of the apparatus or machine. To this end, with the CAM software the different tools are selected at different moments of the process according the CAD file, and the post-processor provides the programs with instructions for operation of the CNC apparatus or machine so that the machine and the tools thereof are operated according to the process conditions, the different tools are selected at the different moments of the process, thereby physically unloading and moving one tool and physically moving and loading the subsequent tool, and then physically moving the subsequent tool according to the corresponding path or trajectory defined for the same, this process being repeated over the whole manufacturing process.

CAM was envisioned as a software for assisting in manufacturing processes, particularly for operating apparatuses or machines of manufacturing processes, mainly because workpieces having more complex shapes had to be processed, and/or be processed so as to provide them with a more complex final shape. Thus, operating the physical tools, e.g. saws, drills, mills, etc., of such apparatuses or machines became cumbersome, complex and time-consuming.

Thanks to a number of improvements made to several energy beam emitting apparatuses, for example laser apparatuses, the irradiation of a workpiece with an energy beam may, in some cases, process the workpiece in a way similar to a physical tool used in manufacturing process; moreover, the energy beam may process the workpiece faster and more accurate than the analogous physical tool. Further, by adjusting the way how the energy beam irradiates the workpiece, the effect of different physical tools may be provided. By way of example, patent documents WO-2014/037281-A2 and WO-2016/026706-A1 describe, inter alia, provision of an energy beam on a workpiece such that energy deposition thereon may be adjusted in a controlled manner. Accordingly, each configuration of such energy beam emitting apparatuses makes possible to process a workpiece in a different way, which makes it versatile since one configuration is generally more suitable for processing a workpiece according to a desired shape, and other configurations are generally more suitable for processing the workpiece according to other desired shapes, and so on. Operating the apparatus in these different ways may improve both the product provided by the manufacturing process and the time it takes to complete the processing.

However, the controllers that operate and control apparatuses involved in manufacturing processes are configured to process instructions in a programming language for controllers, and CAM software works as it was originally envisioned, that is, for setting up a manufacturing process entailing the selection of process conditions, the selection of different physical tools and guidance of the same along paths. Reconfiguration and operation of energy beam emitting apparatuses is thus not possible in CAM with the technology known in the art since the reconfiguration does not entail any tool switching, but rather it entails changing how the apparatuses emit and scan their energy beam towards the workpiece.

There is an interest in providing a way in which manufacturing processes based on CAM software may involve the operation of an apparatus that provides an energy beam, for example a laser apparatus that emits a laser beam, such that the emission and scanning thereof may be adjusted during the manufacturing processes.

SUMMARY

A first aspect of the disclosure relates to a method for operating a machine, the machine comprising moveable axes and an apparatus for emitting an energy beam, the method comprising: providing a computing device or system; providing, the computing device or system, a program for operating the axes of the machine based on a CAD file, the program comprising a plurality of controller instructions for operating the axes; and providing the program to a controller of the machine; the computing device or system adds a plurality of apparatus instructions to the program, each apparatus instruction corresponding to an energy beam radiation configuration of a plurality of energy beam radiation configurations for the apparatus; each time the controller runs a line of the program that has an apparatus instruction, the computing device or system operates the apparatus according to the apparatus instruction; and each apparatus instruction added to the program is a comment for the controller.

With the present method a machine is operated in a manufacturing process that entails the provision of a program for a controller by means of computer-aided manufacturing software as in the state of the art, yet during the manufacturing process the apparatus of the machine may be operated in a number of ways so that it may be adjusted how the energy beam irradiates a workpiece. Accordingly, the apparatus is operated by an apparatus controller (that the computing device or system comprises) whereas the axes of the machine (including those of the apparatus) are operated by the controller of the machine.

The CAD file is processed by the computing device or system so as to provide an NC program, i.e. numerical control program, having controller instructions for operating the axes of the machine. The NC program and, thus, the controller instructions are written in a programming language for controllers as known in the art. The program may be provided using a software solution known in the art, for example AutoDesk PowerMill®, Tebis, etc. The controller operates the axes of the machine according to these instructions upon running the program.

The computing device or system adds instructions for operating the apparatus to the NC program; these instructions, also referred to as apparatus instructions, are intended to load the configurations of the apparatus that are necessary for conducting the manufacturing process. The different configurations for the apparatus are first defined so that the same may be selected in the CAM software together with the process conditions. The configurations for the apparatus selected will be applied to the apparatus by an apparatus controller (thereby adjusting how the energy beam irradiates the workpiece during the manufacturing process), whereas the process conditions will result in the operation of the machine by the controller (thereby operating the axes of machine, which include the axes of the apparatus). Therefore, the computing device or system provides the NC program with controller instructions, and adds the corresponding apparatus instructions thereto, yet the apparatus instructions are added in the form of comments for the controller, namely, comments in the programming language of the program.

The post-processor, as known in the art, generates the program with controller instructions with which the axes of the machine are operated by the controller. But, in contrast to the prior-art, the post-processor is configured to provide the plurality of apparatus instructions in the form of comments for the controller. The program is provided with the two sets of instructions owing to the post-processor.

The program may be provided to the controller either by transmission thereof from the computing device or system to the controller (e.g. wired connection, wireless connection) or by delivery thereof by means of a physical medium (e.g. a device with flash memory, an optical disk, etc.) having the program stored thereon.

Upon running the program, the controller processes the controller instructions for operating the axes, whereas it ignores the comments, which include the apparatus instructions.

Each configuration for the apparatus sets the operation thereof such that it behaves differently, hence the apparatus may operate in a number of ways without any tool switching that takes place in the apparatuses and machines of the prior art working based on CAM software. In this sense, the different configurations for the apparatus establish a digital toolbox rather than a physical toolbox as in the state of the art; in said digital toolbox are provided the different tools, each of which uses the same apparatus but configures the irradiation of the workpiece differently.

As the computing device or system is connected to both the controller and the apparatus, when the controller is running the program provided with both sets of instructions (that is to say, the set of instructions for operating the axes and the set of instructions for operating the apparatus with different configurations), the controller operates the axes accordingly, and the computing device or system runs the program so as to operate the apparatus with selected configurations at the same time and synchronized with the controller. The computing device or system, particularly an apparatus controller thereof, reads the program and retrieves all the comments, then it recovers any instructions provided in said comments so that it may process them during the manufacturing process.

In some embodiments, the method further comprises: receiving, the computing device or system, data indicative of position and, optionally, speed of the axes from sensors of the machine or from the controller; and/or receiving, the computing device or system, data indicative of execution of the program by the controller, said data being received from the controller.

The energy beam is emitted and scanned in a controlled manner during a manufacturing process based on CAM software. The computing device or system operates the apparatus, that is to say, adjusts the configuration with which the energy beam irradiates the workpiece synchronized with the operation, by the controller, of the axes of the machine. Therefore, even though the program includes both sets of instructions but each is processed by a different device or system, both the controller and the computing device or system operate simultaneously and synchronously so that the manufacturing process is carried out correctly.

To this end, the computing device or system receives data with which it may determine when it must modify the operation of the apparatus during the manufacturing process. In some cases, the computing device or system receives data indicative of the position of the axes (but it may also receive data indicate of the speed of the axes), from sensors of the machine, for example encoders that provide measurements relative to the position of the axes as they are moved with the motors; in these cases, since the computing device or system also has in the program the controller instructions, it processes the same so as to determine how the axes must be positioned to trigger (as defined with one or more apparatus instructions) the modification of the emission and scanning of the energy beam. In some other cases, the computing device or system receives such data from the controller itself and proceeds in the same way as aforementioned.

In some other cases, the computing device or system receives from the controller data indicative of the execution of the program. As the controller runs the program, it indicates which line it is currently running. Accordingly, the computer device or system knows which line is being currently run at the controller, hence it runs the apparatus instructions of the line that is being executed at the controller if there is any comment in that line with an apparatus instruction therein, thereby maintaining the synchrony with the controller.

In some cases, both the data indicative of the position of the axes (and, optionally, of the speed of the axes) and the data indicative of the execution of the program at the controller are received by the computing device or system, and both data are used to determine when the apparatus instructions shall be run by the computing device or system.

In some embodiments, the method further comprises storing the plurality of configurations for the apparatus in the computing device or system.

In some embodiments, the method further comprises receiving, the computing device or system from a device or system different from the computing device or system, a configuration for the apparatus according to an apparatus instruction, wherein the configuration of the apparatus is modified according to the received configuration for the apparatus.

The different configurations with which the apparatus may emit and scan the energy beam are stored either in the computing device or system (for example in at least one memory thereof providing a storage unit, and for instance in the form of a database or a folder in a file system), or in a different computing device or system. When the program is being provided, the apparatus instructions are added to the program based on the available configurations, that is, the plurality of energy beam radiation configurations, and also based on the desired irradiation of the workpiece with the energy beam at different time moments during the manufacturing process.

During the manufacturing process, when a line of the program has an apparatus instruction added thereto, the computing device or system retrieves the configuration for the apparatus from the plurality of configurations corresponding to the apparatus instruction. The computing device or system then operates the apparatus in accordance with the retrieved configuration.

In some embodiments, the computing device or system further adds to the program the plurality of configurations as comments for the controller.

The program may also include the definition of the configurations so that the computing device or system knows how to adjust the emission and scanning of the energy beam with just the data provided in the program.

In some embodiments, the method further comprises one of: providing the CAD file to the computing device or system; and generating the CAD file with the computing device or system.

The CAD file is processed by the computing device or system in order to provide the program with which both the axes of the machine and the apparatus of the machine are going to be operated. The CAD file may be generated in the same computing device or system, or may be generated in a different device or system, in which case it is provided to the computing device or system in order to generate the program.

In some embodiments, the computing device or system comprises: a program generating unit for providing the program; a data transmission and reception unit; and an apparatus controlling unit.

The computing device or system comprises at least one processor that is configured to provide the program by means of the program generating unit and process the program, upon running the same, by means of the apparatus controlling unit. Owing to the data transmission and reception unit, the computing device or system may, in some embodiments, transmit the program to the controller when the same is provided, and receives, from the controller, data indicative of which instruction of the program is being currently run by the controller during execution of the same and/or receives data indicative of the position of the axes (and, in some embodiments, of the speed of the axes) from sensors of the machine or the controller.

The apparatus controlling unit is configured to process the program and apply the energy beam emission and scanning configurations to the apparatus. The apparatus controlling unit commands one or more devices of the apparatus (e.g. a scanner thereof, an energy beam source thereof, a lens thereof, etc.) to function in a determined way, thereby configuring the apparatus to operate as if it were a different tool each time. To this end, the apparatus controlling unit takes data relative to a selected radiation configuration for emitting and scanning the energy beam and operates the devices of the apparatus accordingly. By means of the data transmission and reception unit, the apparatus controlling unit is provided with the data indicative of the current execution of the program by the controller or the data indicative of the position of the axes in order to operate the apparatus simultaneously and synchronously with the controller.

By way of example, the apparatus controlling unit controls the scanner of the apparatus so that the energy beam is scanned, with respect to the workpiece, according to a specific scanning pattern and with a constant or variable scanning speed that may be greater or lower depending on the configuration. The apparatus controlling unit also controls the power of the source so that greater or lower energy is deposited on the workpiece (which also depends on the scanning speed) depending on the configuration. The apparatus controlling unit thus functions as an apparatus controller.

The data transmission and reception unit may include wired and/or wireless communications means such as cables for electrical connection, cables for an Ethernet communication, antennas for radiating and capturing electromagnetic waves, etc.

In some embodiments, a first computing device of the computing device or system comprises the program generating unit, and a second computing device of the computing device or system comprises the apparatus controlling unit.

In some embodiments, each configuration of the plurality of configurations comprises a scanning pattern, one or more scanning speeds, and one or more of: a size of the spot of the energy beam, a power of the energy beam, and a power distribution within the energy beam.

In some embodiments, the apparatus is a laser apparatus and the energy beam is a laser beam.

In some embodiments, the energy beam is a beam of electromagnetic radiation or a light beam, for example, a laser beam.

In some embodiments, the power of the energy beam is over e.g. 1 kW, for instance 2 kW, 3 kW, 5 kW, etc. and less than e.g. 20 kW, for instance less than 15 kW or less than 10 kW.

A second aspect of the disclosure relates to a system for operating a machine, the machine comprising moveable axes and an apparatus for emitting an energy beam, the system comprising: a computing device or system comprising: a program generating unit configured to provide a program for operating the axes of the machine based on a CAD file, the program comprising a plurality of controller instructions for operating the axes; a data transmission and reception unit; and an apparatus controlling unit configured to process the program; the program generating unit is further configured to add a plurality of apparatus instructions to the program, each apparatus instruction corresponding to an energy beam radiation configuration of a plurality of energy beam radiation configurations for the apparatus; the apparatus controlling unit is further configured to operate the apparatus each time the controller runs a line of the program that has an apparatus instruction, the apparatus controlling unit operating the apparatus according to the apparatus instruction; and each apparatus instruction added to the program is a comment for the controller.

The system operates a machine with an apparatus capable of emitting and scanning an energy beam in a manufacturing process based on the provision of a program for a controller by means of computer-aided manufacturing software as in the state of the art, yet during the manufacturing process the apparatus of the machine may be operated in a number of ways.

The computing device or system, by means of the program generating unit, generates an NC program for a controller that has instructions for operating the axes of the machine (including the axes of the apparatus), and instructions for configuring the emission and scanning of the energy beam of the apparatus, both of which are to be executed during the manufacturing process. The instructions for operating the axes, i.e. controller instructions, can be processed by the controller as known in the state of the art, whereas the instructions for configuring the apparatus, i.e.

apparatus instructions, cannot be processed by the controller because they are intended to reconfigure the same apparatus in different ways, thus they are to be processed by the apparatus controlling unit, which is an apparatus controller.

In this sense, the computing device or system adds the apparatus instructions to the program that is provided with the controller instructions. This is done by adding such apparatus instructions as comments in the programming language of the program, which is the programming language that the controller is configured to process as known in the art, consequently the controller does not try to process instructions that it is not programmed to carry out due to the aforementioned limitations. However, the computing device or system processes said comments so as to retrieve the apparatus instructions during the manufacturing process and operates the apparatus by means of the apparatus controlling unit. A post-processor of the program generating unit provides the program with the plurality of controller instructions and the plurality of apparatus instructions.

The data transmission and reception unit may include wired and/or wireless communications means such as cables for electrical connection, cables for an Ethernet communication, antennas for radiating and capturing electromagnetic waves, etc. The data transmission and reception unit may be configured to transmit the program to the controller of the machine.

In some embodiments, the data transmission and reception unit is configured or further configured to receive data indicative of execution of the program by the controller, said data being received from the controller, and/or data indicative of position and, optionally, speed of the axes, said data being received from sensors of the machine or from the controller. In some of these embodiments, both data are received and used to determine when the apparatus instructions shall be run by the computing device or system.

In some embodiments, the system further comprises a storage unit configured to store the plurality of configurations for the apparatus.

The available configurations for the apparatus are stored in a storage unit, for example a folder in a file system, or a database; each configuration has identified its apparatus instruction and the different devices of the apparatus that shall be operated and how. The program provided by the program generating unit has added therein apparatus instructions in accordance with the stored plurality of configurations.

Upon running the program by the controller, the computing device or system looks for the configurations for the apparatus in the storage unit each time that an apparatus instruction is processed by the computing device or system.

In some embodiments, the data transmission and reception unit is configured or further configured to transmit an apparatus instruction to a device or system different from the computing device or system, and further configured to receive a configuration for the apparatus from the device or system different from the computing device or system; the apparatus unit is configured to operate the apparatus according to the configuration received.

The computing device or system looks for the configurations for the apparatus in a different device or system (where the plurality of configurations is stored) each time that an apparatus instruction is processed by the computing device or system. The computing device or system operates the apparatus with the apparatus unit according to the retrieved configurations.

In some embodiments, the data transmission and reception unit is configured or further configured to receive the CAD file.

A device or system different from the computing device or system may transmit the CAD file to the computing device or system for processing of the same so as to generate the NC program.

In some embodiments, the computing device or system further comprises a computer-aided design introduction unit for generating a CAD file.

The at least one processor provides the CAD file by means of the computer-aided design introduction unit. The CAD file provided is then used by the program generating unit to provide the NC program.

In some embodiments, the system further comprises the controller.

In some embodiments, the system further comprises the machine.

In some embodiments, each configuration of the plurality of configurations comprises a scanning pattern, one or more scanning speeds, and one or more of: a size of the spot of the energy beam, a power of the energy beam, and a power distribution within the energy beam.

In some embodiments, the apparatus is a laser apparatus and the energy beam is a laser beam.

In some embodiments, the energy beam is a beam of electromagnetic radiation or a light beam, for example, a laser beam.

In some embodiments, the power of the energy beam is over e.g. 1 kW, for instance 2 kW, 3 kW, 5 kW, etc. and less than e.g. 20 kW, for instance less than 15 kW or less than 10 kW.

Similar advantages as those described for the first aspect of the disclosure also apply to this aspect of the disclosure.

A third aspect of the disclosure relates to a computer program product that has instructions which, when executed by a computing device or system, cause the computing device or system to perform the steps of: storing, in the computing device or system, a plurality of energy beam radiation configurations for an apparatus of a machine, the apparatus being configured to provide an energy beam; adding a plurality of apparatus instructions to a program with a plurality of controller instructions for operating axes of the machine, each apparatus instruction corresponding to an energy beam radiation configuration of the plurality of energy beam radiation configurations for the apparatus; and modifying an operation of the apparatus each time a controller of the machine runs a line of the program that has an apparatus instruction, the operation of the apparatus being modified according to the apparatus instruction; and each apparatus instruction added to the program is a comment for the controller.

The computer program product makes the computing device or system to store a plurality of configurations that the apparatus may be operated with. For example, the configurations may be stored in a storage unit of the computing device or system.

Further, the computer program product adds apparatus instructions, to an NC program, as comments in the programming language of the program. As the controller is configured to process programs in such programming language, the controller does not process the comments and, thus, does not execute the apparatus instructions when it runs the program. The computing device or system, however, operates the apparatus as the computer program product processes the program and the apparatus instructions therein.

In some embodiments, the instructions further cause the computing device or system to perform the step of receiving: data indicative of execution of the program by the controller, said data being received from the controller, and/or data indicative of position and, optionally, speed of the axes of machine, said data being received from sensors of the machine or from the controller. In some of these embodiments, the instructions cause the computing device or system to receive and use both data when the computing device or system shall modify the operation of the apparatus according to the apparatus instructions of the program.

In some embodiments, the instructions further cause the computing device or system to perform the step of providing the program with the plurality of controller instructions for operating the axes of the machine based on a CAD file.

In some embodiments, the instructions further cause the computing device or system to perform the step of providing the CAD file. In some other embodiments, the instructions further cause the computing device or system to perform the step of receiving the CAD file.

In some embodiments, each configuration of the plurality of configurations comprises a scanning pattern, one or more scanning speeds, and one or more of: a size of the spot of the energy beam, a power of the energy beam, and a power distribution within the energy beam.

In some embodiments, the apparatus is a laser apparatus and the energy beam is a laser beam.

In some embodiments, the energy beam is a beam of electromagnetic radiation or a light beam, for example, a laser beam.

In some embodiments, the power of the energy beam is over e.g. 1 kW, for instance 2 kW, 3 kW, 5 kW, etc. and less than e.g. 20 kW, for instance less than 15 kW or less than 10 kW.

A fourth aspect of the disclosure relates to a data stream which is representative of a computer program product according to the third aspect of the disclosure.

Similar advantages as those described for the first and second aspects of the disclosure may also be applicable to the third and fourth aspects of the disclosure.

A fifth aspect of the disclosure relates to a method for operating a machine, the machine comprising moveable axes and an apparatus for emitting an energy beam, the method comprising: providing a computing device or system; providing, the computing device or system, a first program for operating the axes of the machine based on a CAD file, the first program comprising a plurality of controller instructions for operating the axes; providing the first program to a controller of the machine; providing, the computing device or system, a second program with the same plurality of controller instructions of the first program; the computing device or system converts, in the second program, the plurality of controller instructions into comments in a programming language of the second program; the computing device or system adds a plurality of apparatus instructions for operating the apparatus to the second program, each apparatus instruction corresponding to an energy beam radiation configuration of a plurality of energy beam radiation configurations for the apparatus; and wherein: each time the controller runs a controller instruction of the first program whose corresponding line on the second program has an apparatus instruction, the computing device or system operates the apparatus according to the apparatus instruction; and/or each time the controller finishes running a controller instruction of the first program, the computing device or system operates the apparatus according to any apparatus instruction in any line or lines of the second program subsequent to the line thereof that has the controller instruction that the controller has finished running, and the any line or lines being lines of the second program not having controller instructions.

The method makes possible to carry out a manufacturing process involving the reconfiguration of the apparatus of the machine during the process, and despite the provision of the program for the controller by means of computer-aided manufacturing software as in the state of the art.

The first program with the controller instructions is provided to the controller so that it may operate the axes of the machine during the manufacturing process; it may be provided either by transmission thereof from the computing device or system to the controller or by delivery thereof by means of a physical medium having the program stored thereon. The second program with the apparatus instructions is run by the computing device or system so that it may modify the emission and scanning of the energy beam of the apparatus during the manufacturing process. The computing device or system is capable of determining when the emission and/or scanning of the energy beam shall be altered based on the existence of the controller instructions in the second program, even though the same are first converted by the first computing device or system into comments. The computing device or system does not run the controller instructions, but it processes them to keep the synchrony between its own actions (to operate the apparatus) and the actions of the controller (to operate the axes of the machine).

When a controller instruction run by the controller, which runs the first program, has associated therewith an apparatus instruction (i.e. the line of the second program having said controller instruction, in the form of a comment, also has an apparatus instruction), the computing device or system runs said apparatus instruction. Additionally or alternatively, when the controller finishes running a controller instruction, the computing device or system processes the lines of the second program that are subsequent to the line of the second program having said controller instruction, in the form of a comment; if the computing device or system finds in any subsequent line or lines apparatus instructions, it runs them only if said subsequent line or lines do not further comprise controller instructions in the form of comments. This is so because if said subsequent line or lines comprise controller instructions, the associated apparatus instructions will be run by the computing device or system when the controller runs the controller instructions. Since the controller is not aware of the existence of any instructions other than the controller instructions, it does not stop running the first program, therefore if there are any apparatus instructions between two consecutive controller instructions, the computing device or system runs them when the controller finishes running the first of the two consecutive lines. This behavior is repeated during the entire execution of the first and second programs.

In some embodiments, each time the controller is about to start running the first program, the computing device or system operates the apparatus according to any apparatus instruction in any line or lines of the second program before a line thereof that has a first controller instruction.

The second program may include apparatus instructions at the beginning thereof which shall be run upon initiation of the manufacturing process, for example an apparatus instruction to configure the initial operation of the apparatus, or definitions of configurations that may be necessary to configure the operation of the apparatus upon running other apparatus instructions of the second program during the manufacturing process. Hence, when the controller is about to start running the first program, the computing device or system runs all the lines (if any) at the beginning of the second program up to the line that comprises the first controller instruction of the second program.

In some embodiments, the method further comprises: receiving, the computing device or system, data indicative of position and, optionally, speed of the axes from sensors of the machine or from the controller; and/or receiving, the computing device or system, data indicative of execution of the first program by the controller, said data being received from the controller. In some of these embodiments, both the data indicative of the position of the axes (and, optionally, of the speed of the axes) and the data indicative of the execution of the first program at the controller are received by the computing device or system, and both data are used to determine when the apparatus instructions of the second program shall be run by the computing device or system.

In some embodiments, the method further comprises storing the plurality of configurations for the apparatus in the computing device or system.

In some embodiments, the method further comprises receiving, the computing device or system from a device or system different from the computing device or system, a configuration for the apparatus according to an apparatus instruction, wherein the configuration of the apparatus is modified according to the received configuration for the apparatus.

In some embodiments, the method further comprises one of: providing the CAD file to the computing device or system; and generating the CAD file with the computing device or system.

In some embodiments, the computing device or system comprises: a program generating unit for providing the first and second programs; a data transmission and reception unit; and an apparatus controlling unit. The apparatus controlling unit is configured to process the second program.

In some embodiments, each configuration of the plurality of configurations comprises a scanning pattern, one or more scanning speeds, and one or more of: a size of the spot of the energy beam, a power of the energy beam, and a power distribution within the energy beam.

In some embodiments, the apparatus is a laser apparatus and the energy beam is a laser beam.

In some embodiments, the energy beam is a beam of electromagnetic radiation or a light beam, for example, a laser beam.

In some embodiments, the power of the energy beam is over e.g. 1 kW, for instance 2 kW, 3 kW, 5 kW, etc. and less than e.g. 20 kW, for instance less than 15 kW or less than 10 kW.

A sixth aspect of the disclosure relates to a system for operating a machine, the machine comprising moveable axes and an apparatus for emitting an energy beam, the system comprising: a computing device or system comprising: a program generating unit configured to provide a first program for operating the axes of the machine based on a CAD file, the first program comprising a plurality of controller instructions for operating the axes; a data transmission and reception unit; and an apparatus controlling unit configured to process a second program; the program generating unit is further configured to: provide the second program with the same plurality of controller instructions of the first program; convert, in the second program, the plurality of controller instructions into comments in a programming language of the second program; add a plurality of apparatus instructions for operating the apparatus to the second program, each apparatus instruction corresponding to an energy beam radiation configuration of a plurality of energy beam radiation configurations for the apparatus; the apparatus controlling unit is further configured to: operate the apparatus, each time the controller runs a controller instruction of the first program whose corresponding line on the second program has an apparatus instruction, according to the apparatus instruction; and/or operate the apparatus, each time the controller finishes running a controller instruction of the first program, according to any apparatus instruction in any line or lines of the second program subsequent to the line thereof that has the controller instruction that the controller has finished running, and the any line or lines being lines of the second program not having controller instructions.

In some embodiments, the apparatus controlling unit is further configured to operate the apparatus, when the controller is about to start running the first program, according to any apparatus instruction in any line or lines of the second program before a line thereof that has a first controller instruction.

In some embodiments, the data transmission and reception unit is configured or further configured to transmit the first program to the controller of the machine.

In some embodiments, the data transmission and reception unit is configured or further configured to receive data indicative of execution of the first program by the controller, said data being received from the controller, and/or data indicative of position and, optionally, speed of the axes, said data being received from sensors of the machine or from the controller. In some of these embodiments, both data are received and used to determine when the apparatus instructions of the second programs shall be run by the computing device or system.

In some embodiments, the data transmission and reception unit is configured or further configured to transmit an apparatus instruction to a device or system different from the computing device or system, and further configured to receive a configuration for the apparatus from the device or system different from the computing device or system; the apparatus unit is configured to operate the apparatus according to the configuration received.

In some embodiments, the data transmission and reception unit is configured or further configured to receive the CAD file.

In some embodiments, the computing device or system further comprises a computer-aided design introduction unit for generating a CAD file.

In some embodiments, the system further comprises the controller.

In some embodiments, the system further comprises the machine.

In some embodiments, each configuration of the plurality of configurations comprises a scanning pattern, one or more scanning speeds, and one or more of: a size of the spot of the energy beam, a power of the energy beam, and a power distribution within the energy beam.

In some embodiments, the apparatus is a laser apparatus and the energy beam is a laser beam.

In some embodiments, the energy beam is a beam of electromagnetic radiation or a light beam, for example, a laser beam.

In some embodiments, the power of the energy beam is over e.g. 1 kW, for instance 2 kW, 3 kW, 5 kW, etc. and less than e.g. 20 kW, for instance less than 15 kW or less than 10 kW.

Similar advantages as those described for the fifth aspect of the disclosure also apply to this aspect of the disclosure.

A seventh aspect of the disclosure relates to a computer program product that has instructions which, when executed by a computing device or system, cause the computing device or system to perform the steps of: storing, in the computing device or system, a plurality of energy beam radiation configurations for an apparatus of a machine, the apparatus being configured to provide an energy beam; providing a first program with a plurality of controller instructions, of a second program to be run by a controller of the machine, for operating axes of the machine, the second program being for operating the axes of the machine based on a CAD file and comprising the plurality of controller instructions; converting, in the first program, the plurality of controller instructions into comments in a programming language of the first program; adding a plurality of apparatus instructions to the first program, each apparatus instruction corresponding to an energy beam radiation configuration of the plurality of energy beam radiation configurations for the apparatus; and modifying an operation of the apparatus such that: each time the controller of the machine runs a controller instruction of the second program whose corresponding line on the first program has an apparatus instruction, the operation of the apparatus being modified according to the apparatus instruction; and/or each time the controller of the machine finishes running a controller instruction of the second program, according to any apparatus instruction in any line or lines of the first program subsequent to the line thereof that has the controller instruction that the controller has finished running, and the any line or lines being lines of the first program not having controller instructions.

In some embodiments, the instructions further cause the computing device or system to perform the step of modifying an operation of the apparatus, when the controller is about to start running the first program, according to any apparatus instruction in any line or lines of the first program before a line thereof that has a first controller instruction.

In some embodiments, the instructions further cause the computing device or system to perform the step of receiving: data indicative of execution of the second program by the controller, said data being received from the controller, and/or data indicative of position and, optionally, speed of the axes of machine, said data being received from sensors of the machine or from the controller. In some of these embodiments, the instructions cause the computing device or system to receive and use both data to determine when the computing device or system shall modify the operation of the apparatus according to the apparatus instructions of the first program.

In some embodiments, the instructions further cause the computing device or system to perform the step of providing the second program with the plurality of controller instructions for operating the axes of the machine based on a CAD file.

In some embodiments, the instructions further cause the computing device or system to perform the step of providing the CAD file. In some other embodiments, the instructions further cause the computing device or system to perform the step of receiving the CAD file.

In some embodiments, each configuration of the plurality of configurations comprises a scanning pattern, one or more scanning speeds, and one or more of: a size of the spot of the energy beam, a power of the energy beam, and a power distribution within the energy beam.

In some embodiments, the apparatus is a laser apparatus and the energy beam is a laser beam.

In some embodiments, the energy beam is a beam of electromagnetic radiation or a light beam, for example, a laser beam.

In some embodiments, the power of the energy beam is over e.g. 1 kW, for instance 2 kW, 3 kW, 5 kW, etc. and less than e.g. 20 kW, for instance less than 15 kW or less than 10 kW.

An eight aspect of the disclosure relates to a data stream which is representative of a computer program product according to the seventh aspect of the disclosure.

Similar advantages as those described for the fifth and sixth aspects of the disclosure may also be applicable to the seventh and eighth aspects of the disclosure.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures:

FIG. 6 shows an exemplary program.

FIG. 7 shows a workpiece processed in accordance with the program of FIG. 6.

DETAILED DESCRIPTION OF THE DRAWINGS

Figure 1:
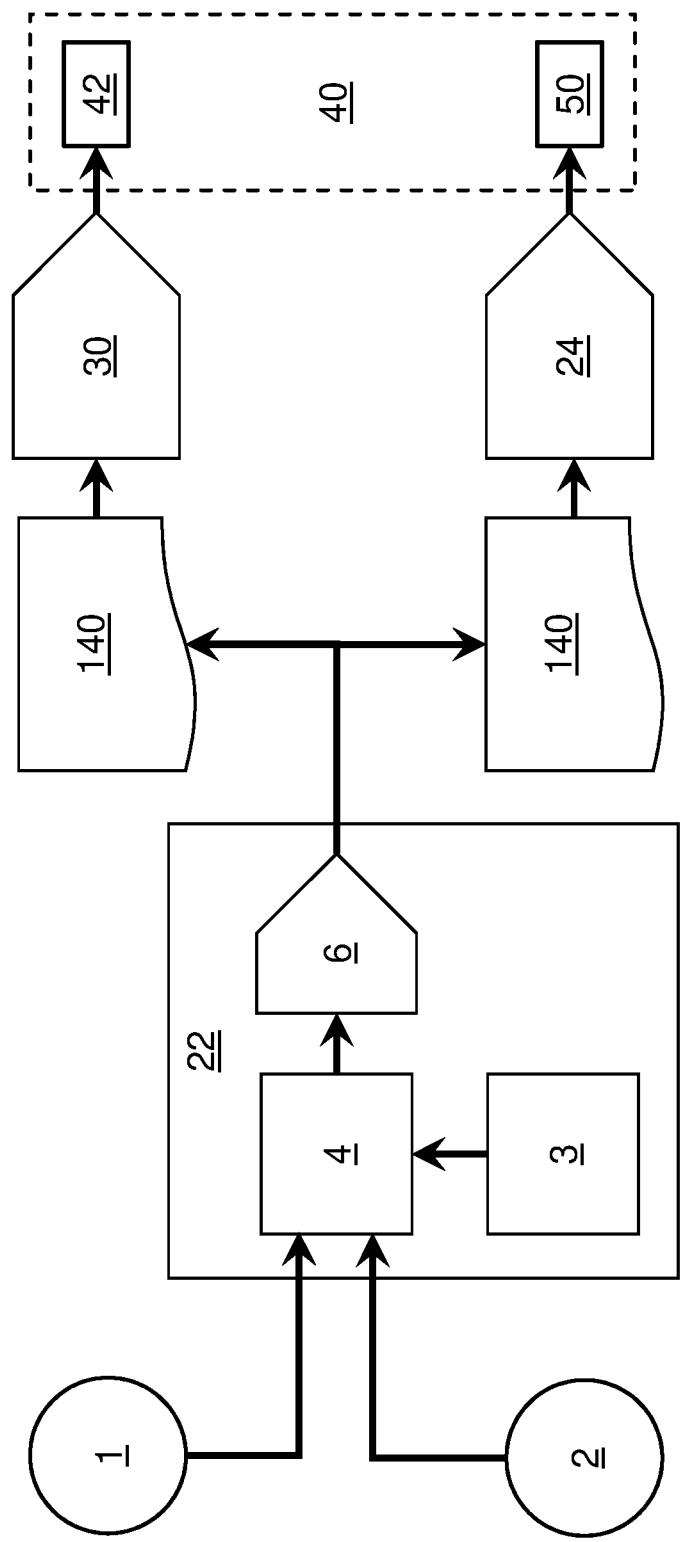
FIG. 1 diagrammatically shows a system in accordance with an embodiment.

FIG. 1 diagrammatically shows a system in accordance with an embodiment.

The system comprises a computing device or system intended to provide a program 140 for operating both axes 42 and an apparatus 50 of a machine 40. With the machine 40 a manufacturing process may be conducted in which a workpiece or an object is processed by means of the apparatus 50, which is capable of providing an energy beam.

The computing device or system comprises a first unit 22 having at least one processor and at least one memory. The first unit 22 is provided with both a CAM software 4 and a post-processor that are intended to provide the program 140.

The CAM software 4 receives a CAD file 1 that defines a geometry of the workpiece or object for the processing thereof. The CAM software 4 also receives process conditions 2, that is, manufacturing directives; these make possible to adjust the operation of the machine 40 in accordance with the manufacturing process. The CAM software 4 further receives definitions 3 of energy beam radiation configurations for the apparatus 50. Upon running the CAM software 4, the defined energy beam radiations configurations make possible to select them for the manufacturing process based on the CAD file 1 and the defined process conditions 2.

The process defined in the CAM software 4 is passed onto the post-processor 6, which generates the program 140 in such a way that the instructions for a controller 30 of the machine 40 are adjusted in accordance with the model of the machine 40. In addition to said instructions, the post-processor 6 adds instructions for operating the apparatus 50. Since controllers of the prior art, but which are to be processed by a second unit 24 of the computing device or system.

In the embodiment of FIG. 1, the post-processor 6 generates a single program 140 that is to be provided to both the controller 30 and the second unit 24. As described more in detail in relation to FIGS. 4 and 5, the program 140 includes instructions for the controller 30, i.e. controller instructions, for the operation of the axes 42, and also includes instructions for the second unit 24, i.e. apparatus instructions, for the operation of the apparatus 50.

In other embodiments, two different programs are generated by the post-processor 6: a first program to be provided to the controller 30 and at least having the controller instructions, and a second program to be provided to the second unit 24 and at least having the apparatus instructions and the controller instructions.

The controller instructions are intended to operate the machine 40, particularly the axes 42 thereof, according to the process defined in the CAM software 4. The apparatus instructions are intended to operate the apparatus 50, particularly one or more of: the source for emitting the energy beam, a scanner for scanning the energy beam, and the optics for adjusting the way in which the energy beam reaches the workpiece or object to be processed, according to the process defined in the CAM software 4.

Figure 2A:
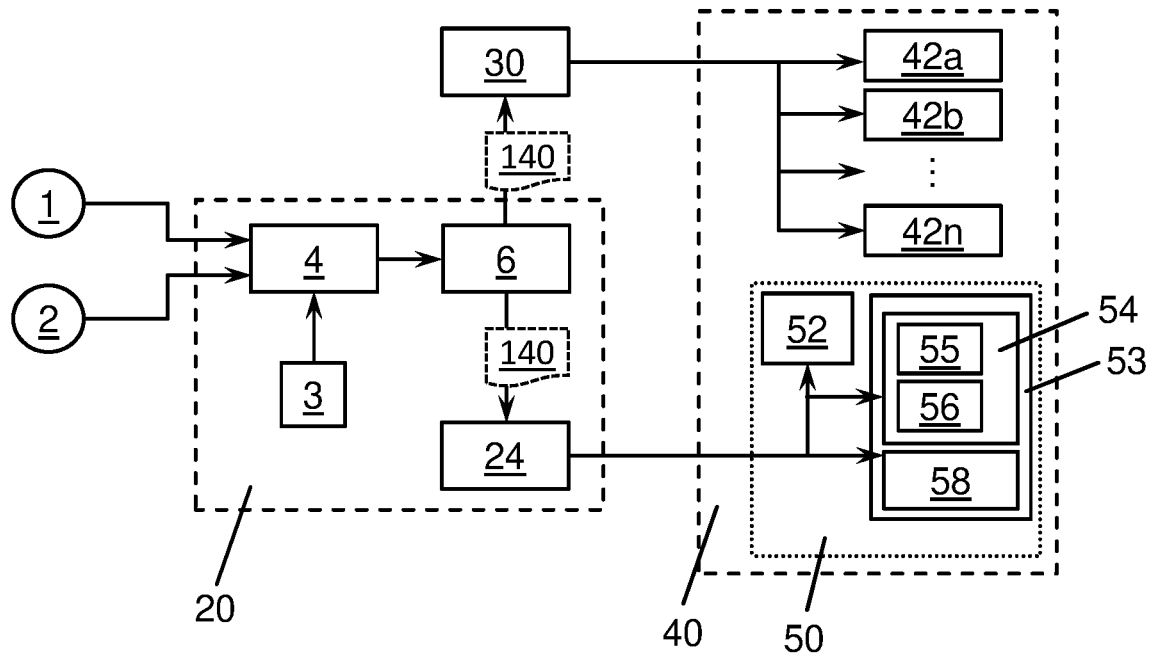
FIGS. 2A-2B diagrammatically show more in detail the system of FIG. 1.
Figure 2B:
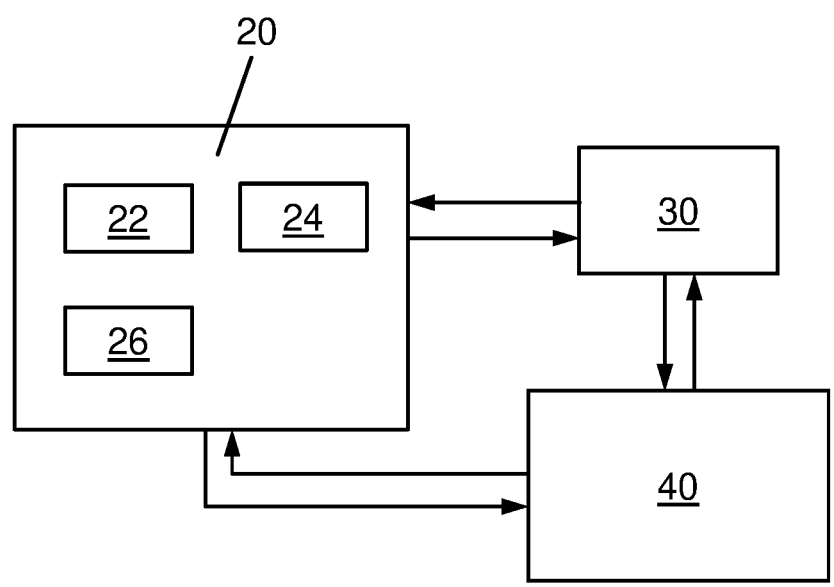

FIGS. 2A-2B diagrammatically show more in detail the system of FIG. 1. The arrows in FIG. 2B illustratively represent the transmission and reception of data.

Illustrated in FIGS. 2A and 2B is the computing device or system 20 (shown in FIG. 2A with dashed lines for the sake of clarity) described with reference to FIG. 1. The computing device or system 20 comprises a program generating unit 22 (i.e. the first unit of FIG. 1) that has the CAM software 4 and the post-processor 6, an apparatus controlling unit 24 (i.e. the second unit of FIG. 1, which may be for example but without limitation a controller card), and a data transmission and reception unit 26.

The program generating unit 22 uses provides the program with both the controller instructions, for the controller 30, and the apparatus instructions, for the apparatus controlling unit 24. Therefore, the apparatus controlling unit 24 processes the program and the apparatus instructions therein so as to operate the apparatus 50 of the machine 40 accordingly.

The data transmission and reception unit 26 enables the at least one processor to transmit and/or receive data using the means for transmitting and receiving data, in this way the at least one processor communicates with the controller 30 and, for example, encoders of the axes of the machine 40, which provide data relative to the position and, optionally, the speed of the axes. Further, sensors provided in the apparatus 50 may also communicate their measurements to the computing device or system 20 through the data transmission and reception unit 26, for example encoders of the scanner of the apparatus 50, an output of the laser source indicating the current power, etc.

The computing device or system 20 may also comprise a storage unit that uses part of the at least one memory, or a memory different from the at least one memory that stores the computer program product for the operation of the computing device or system 20. The plurality of configurations for the apparatus may be stored in the storage unit. Accordingly, the program generating unit 22 and the apparatus controlling unit 24 use the storage unit to provide and process the program so that the apparatus 50 may be operated in accordance with the stored configurations.

The apparatus 50 comprises a source 52 for providing the energy beam and a laser head 53. The laser head 53 includes a scanner 54 for scanning the energy beam by means of first and second mirrors 55, 56 thereof, and it may also include optics 58 (e.g. lenses, mirrors, etc.) for adjusting how the energy beam reaches the surface of the workpiece or object to be processed. The apparatus 50 may be, for instance, a laser apparatus with a laser source that provides a laser beam.

The axes 42a-42n of the machine 40 make possible to move the workpiece or object, and/or the laser head 53 of the apparatus 50 so that different parts of the surface of the workpiece or object may be subjected to irradiation with the energy beam; thus, the axes 42a-42n may provide a relative movement between the workpiece or object and the laser head 53 of the apparatus 50. By way of example, the axes 42a-42n may displace and/or rotate the workpiece or object relative to the laser head 53 at different moments of the manufacturing process, or displace and/or rotate the laser head 53 relative to the workpiece or object at different moments of the manufacturing process. The axes 42a-42n are provided with motors that make possible the movement thereof, thus the controller operates the motors in order to displace and/or rotate the axes 42a-42n in accordance with the program 140.

As the CAM software 4 is adapted to manufacturing processes involving the use of different physical tools for processing the workpiece or object, it is not possible to provide programs with instructions for the controller 30 that would result in the modification of the operation of the apparatus 50, namely, altering the emission and scanning of the energy beam. The post-processor 6, thus, provides the program 140 with controller instructions and further adds the apparatus instructions in the form of comments for the controller 30, that is, comments in the programming language that the controller 30 is configured to process. In this way, the operation of the controller 30 is not affected because the apparatus instructions that may be, but are not necessarily, coded with a different programming language are not processed by the controller 30.

As the controller 30 finds comments in the programming language it processes, despite the same may include apparatus instructions, it ignores them and runs the only instructions it finds, namely, controller instructions for operating the axes 42a-42n. The apparatus controlling unit 24 finds both the controller instructions and the apparatus instructions within the program 140, despite the latter are in the form of comments, and runs the apparatus instructions while the controller 30 runs the controller instructions of the program 140. Upon running the apparatus instructions, the computing device or system 20 modifies the operation of the apparatus 50, particularly the operation of the source 52 and/or the laser head 53 (e.g. the scanner 54, the lens 58, etc.) of the apparatus 50 that affect the provision of the energy beam on the workpiece or object.

The available configurations for the apparatus 50 may be stored in the at least one memory, or in another computing device or system in which case the computing device or system 20 retrieves the plurality of configurations for the apparatus 50 so that the apparatus instructions may be added to the program 140.

The controller 30 receives data relative to the axes 42a-42n, for instance position and/or velocity of the same as provided by sensors coupled to the axes 42a-42n, for example encoders. In some examples, the controller 30 may provide such data to the computing device or system 20, or the latter may receive it from the sensors.

In some other embodiments, the system further comprises the controller 30 and/or the machine 40.

Figure 3:
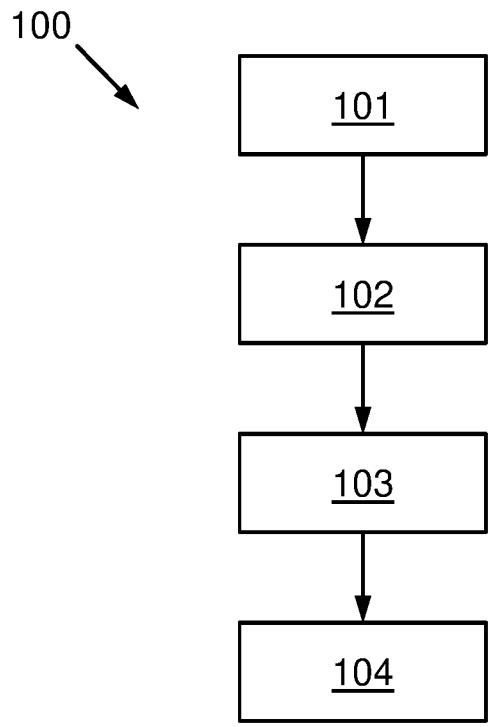
FIG. 3 diagrammatically shows a method in accordance with an embodiment.

FIG. 3 diagrammatically shows a method 100 in accordance with an embodiment.

The method 100 comprises a step 101 of providing a computing device or system (for example the computing device or system 20 of FIGS. 1-2).

The method 100 further comprises a step of providing 102 a program for operating axes (for example the axes 42a-42n of FIG. 1) of a machine (for example the machine 40 of FIGS. 1-2) based on a computer-aided design file. The program provided includes two sets of instructions: one to be processed by a controller (for example the controller 30 of FIGS. 1-2) for operating the axes of the machine, and another one to be processed by the computing device or system for operating an apparatus (for example the apparatus 50 of FIG. 1) capable of emitting an energy beam, the apparatus being part of the machine. This step is carried out by the computing device or system provided in step 101.

The method 100 further comprises a step of providing 103 the program provided in step 102 to the controller. For example, the computing device or system transmits the program to the controller with means for transmitting and receiving data.

The method 100 further comprises a step of operating 104 the apparatus according to apparatus instructions each time the controller runs a line of the program that has an apparatus instruction. This step 104 is carried out by the computing device or system, which processes the apparatus instructions and operates the apparatus in accordance therewith.

Figure 4:
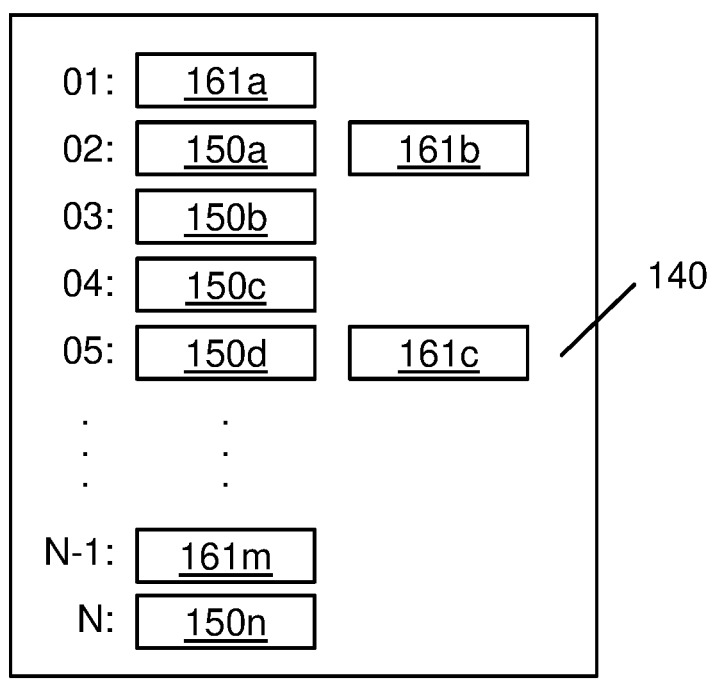
FIG. 4 diagrammatically shows a program provided by systems and methods in accordance with embodiments.

FIG. 4 diagrammatically shows a program 140 provided by systems and methods in accordance with embodiments.

The program 140 comprises a plurality of lines (illustrated in the figure are lines 01, 02, 03, 04, 05, and the N-th line). Each line comprises a controller instruction 150a-150n for operating axes of a machine, and/or an apparatus instruction 161a-161m in the form of a comment.

Figure 5:
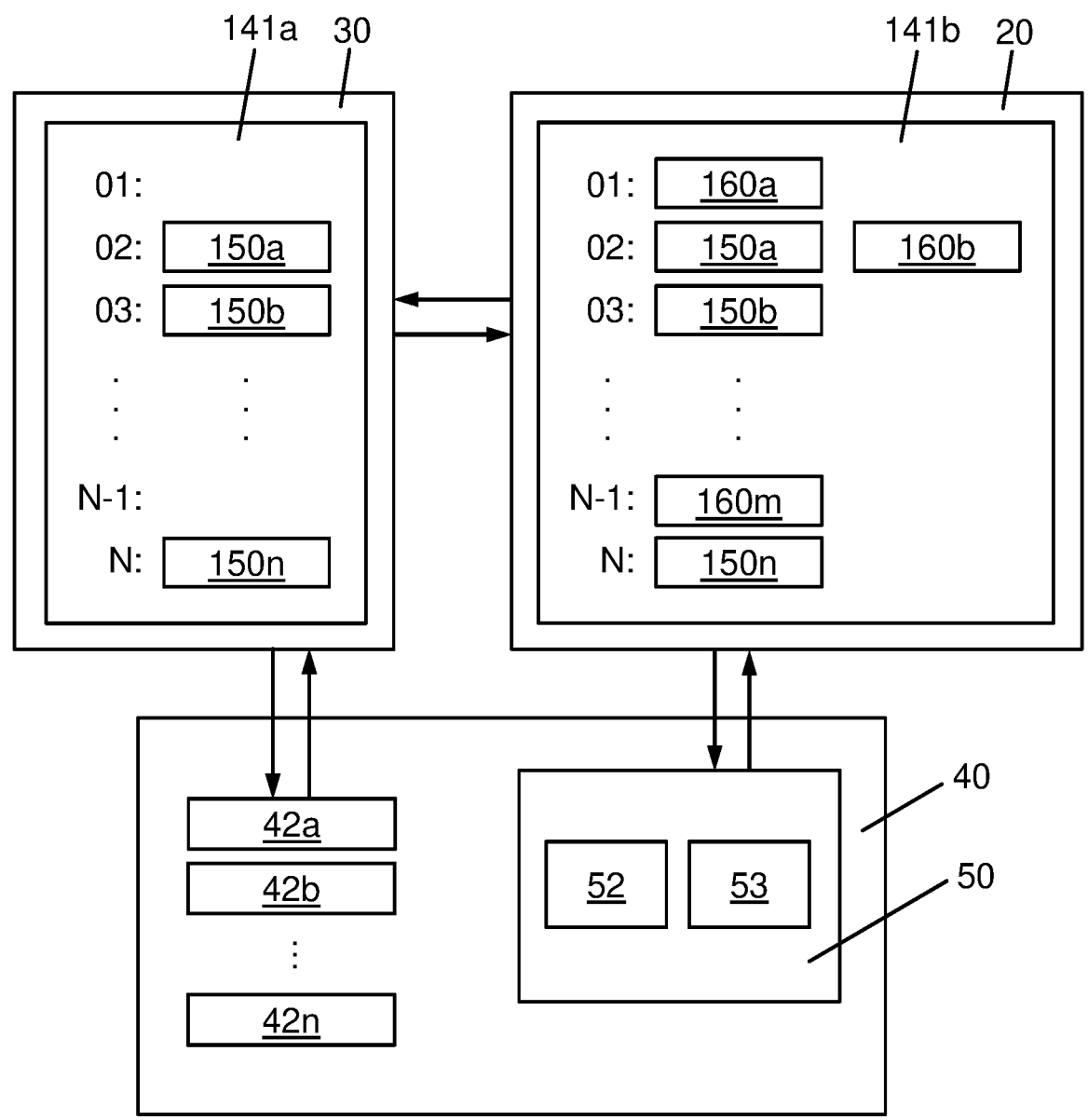
FIG. 5 diagrammatically shows operation of a system in accordance with an embodiment.

FIG. 5 diagrammatically shows operation of a system in accordance with an embodiment.

A program (in this example the program 140 of FIG. 4) is provided to the controller 30 of the machine 40 and, thus, the manufacturing process may be conducted.

When the program is run by the controller 30, the program 141a illustrated is what is actually processed by the controller 30. As it can be seen from FIG. 4, the controller 30 only finds the controller instructions 150a-150n for operating the axes of the machine 40 because the apparatus instructions 161a-161m are comments for the controller 30. The computing device or system 20 processes the program 141b and finds both the controller instructions 150a-150n and the apparatus instructions 160a-160m, the latter being processed despite being provided as comments 161a-161m as described with reference to FIG. 4.

During execution of the program, the computing device or system 20 has knowledge of the status of the manufacturing process as governed by the program, therefore the computing device or system 20 processes the apparatus instructions so as to operate the apparatus 50 of the machine 40. For instance, when the controller 30 is running the line 02, the computing device or system 20 knows that it is line 02 the one currently in execution and, thus, it operates the apparatus 50 in accordance with the apparatus instruction 160b of line 02. To this end, the computing device or system 20 receives from the controller the line that it is currently running, so that the computing device or system 20 runs the same line of the program, and/or receives data indicative of the position (and, in some embodiments, of speed) of the axes of the machine. By means of said data, the computing device or system can process the controller instructions just to determine how the axes are going to be operated by the controller during the manufacturing process, and by checking what is the position (and, in some embodiments, the speed) of the axes, it may determine what line or controller instruction of the program is being currently executed. That is to say, the computing device or system matches the data with the controller instructions.

The arrows in FIG. 5 illustratively represent the transmission and reception of data and/or commands between the controller and the axes 42a-42n, the controller 30 and the computing device or system 20, and the computing device or system 20 and the apparatus 50.

FIG. 6 shows an exemplary program with which axes of a machine and an apparatus (of the machine) for emitting an energy beam may be operated.

The program comprises a plurality of controller instructions in a programming language of the controller that runs the program, and a plurality of comments in the same programming language. As illustrated the comments of the program start with the addition of a semicolon ';'.

Some of these comments include apparatus instructions. In this example, the apparatus instructions are encoded such that they start with the term 'RAIO:', hence lines N5, N7, N12, N15, and N19 include apparatus instructions, whereas lines N1, N2, N3, N4, N6, N9, N10, N11, N13, N14, N16, N17, N18, N20 and N21 include controller instructions. In other exemplary programs, a same line may include both a controller instruction and an apparatus instruction.

It is readily apparent that different methods for providing such apparatus instructions are possible without departing from the scope of the present disclosure. In this sense, the computing device or system is to be configured to add and process the apparatus instructions accordingly, for instance with a keyword that is then recognized by said computing device or system as comprising an apparatus instruction, or even without a keyword, in which case said computing device or system attempts to process all comments so as to determine which ones include apparatus instructions according to a programming language in which the same are provided. The apparatus instructions may be cyphered or obfuscated in some cases for avoiding modification by unauthorized operators or third parties. Further, the apparatus instructions may be provided in the same programming language of the controller instructions (and, thus, of the program) or in a programming language different from the controller instructions.

FIG. 7 shows a workpiece 80 processed in accordance with the program of FIG. 6.

The workpiece 80, upon processing thereof, is provided with a processed surface 81 having a first portion 82, a second portion 83, and a third portion 84. Such processing is the result of the execution of the program of FIG. 6 by both a controller of a machine and a computing device or system, which adjusts the emission and scanning of an energy beam of an apparatus of the machine.

The first portion 82 of the workpiece has been processed with the apparatus (e.g. a laser apparatus) of the machine when the lines N1 to N11 have been run. The line N7 has an apparatus instruction that configures the laser apparatus to irradiate the workpiece 80 with the laser beam being scanned with a scanning pattern in the form of a pentagon having a diameter of 45 mm. Then, on line N12, the computing device or system adjusts the laser apparatus according to the apparatus instruction therein, that is to say, it adjusts the irradiation of the workpiece 80 with the laser beam such that the same is scanned with the scanning pattern of a pentagon having a diameter of 60 mm. The second portion 83 is thus processed accordingly upon execution of lines N12 to N14, and at line N15 a further apparatus instruction results in the reconfiguration of the apparatus. Such reconfiguration leads to the processing of the third portion 84 in which the scanning pattern of the laser beam is in the form of a pentagon having a diameter of 15 mm and a lower power of the laser beam, specifically a 40% of the power ratio in contrast to the first and second portions 82, 83 where the laser source was configured to emit the laser beam at a 100% power ratio.

As it is readily apparent, the laser apparatus has processed the workpiece 80 while the controller has operated the axes of the machine, thereby providing the first, second and third portions 82, 83, 84.

Figure 8:
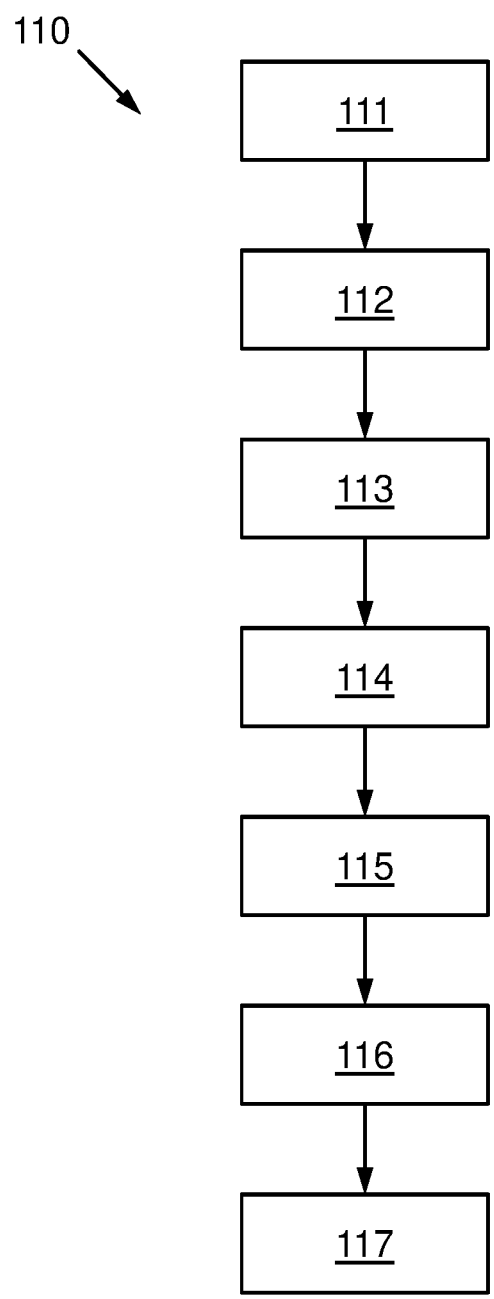
FIG. 8 diagrammatically shows a method in accordance with an embodiment.

FIG. 8 diagrammatically shows a method 110 in accordance with an embodiment.

The method 110 comprises a step of providing 111 a computing device or system (for example the computing device or system 20 of FIGS. 1-2).

The method 110 further comprises a step of providing 112 a first program for operating axes (for example the axes 42a-42n of FIG. 1) of a machine (for example the machine 40 of FIGS. 1-2) based on a computer-aided design file. The program provided includes a plurality of controller instructions for operating the axes that are to be processed by a controller (for example the controller 30 of FIGS. 1-2) of the machine. This step is carried out by the computing device or system provided in step 111.

The method 110 further comprises a step of providing 113 the first program provided in step 112 to the controller.

The method 110 further comprises a step of providing 114 a second program in which the same instructions of the first program are provided, that is, the instructions to be processed by the controller, i.e. controller instructions. This step is carried out by the computing device or system.

The method 110 further comprises a step of converting 115, in the second program of step 114, the plurality of controller instructions into comments in the programming language of the second program. The programming language of the first program and the second program may be the same or different. The programming language of the first program is a programming language that the controller is configured to process. This step is carried out by the computing device or system.

The method 110 further comprises a step of adding 116 a plurality of instructions for operating an apparatus (for example the apparatus 50 of FIGS. 1-2) of the machine to the second program, preferably (but not necessarily) once the step of converting 115 the controller instructions into comments has been carried out. This step is carried out by the computing device or system.

The method 110 further comprises a step of operating 117 the apparatus each time the controller runs a controller instruction of the first program of step 112 whose corresponding line on the second program of step 116 has an apparatus instruction, the apparatus being operated 117 according to the apparatus instruction. Additionally or alternatively, in this step, the apparatus is operated 117 each time the controller finishes running a controller instruction of the first program of step 112, the apparatus is operated according to any apparatus instruction in any line or lines of the second program of step 116 subsequent to the line thereof that has the controller instruction that the controller has finished running, and the any line or lines being lines of the second program not having controller instructions. This step 117 is carried out by the computing device or system, which processes the apparatus instructions and operates the apparatus in accordance therewith. This behavior is further described with reference to the example of FIG. 9.

Figure 9:
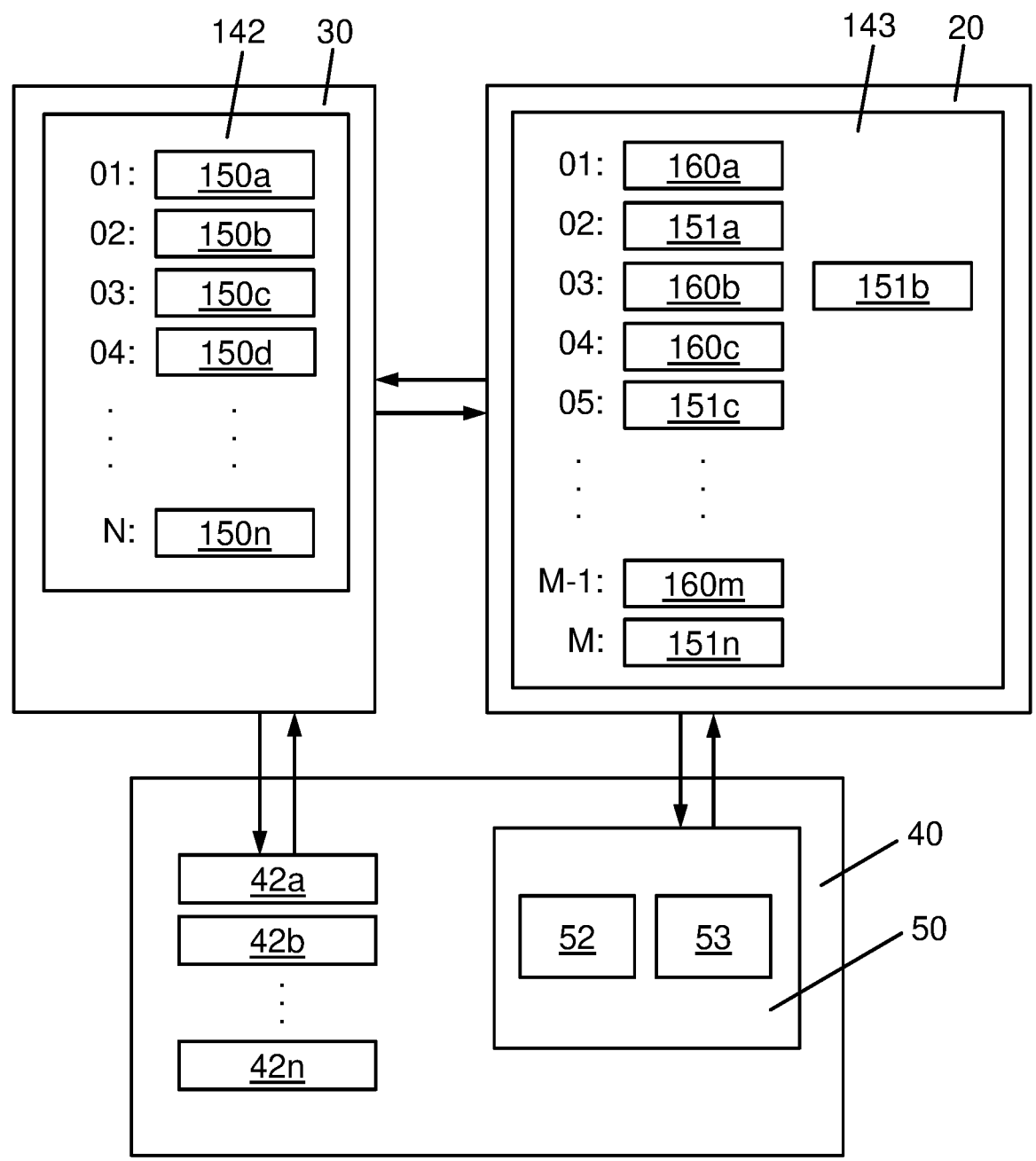
FIG. 9 diagrammatically shows operation of a system in accordance with an embodiment.

FIG. 9 diagrammatically shows operation of a system in accordance with an embodiment.

The system at least comprises the computing device or system 20, which communicates with the controller 30 and the machine 40.

The controller 30 is provided with a first program 142, and the computing device or system 20 is provided with a second program 143.

The first program 142 (lines 01, 02, 03, 04 and the N-th line are illustrated) comprises a plurality of instructions to be executed by the controller, i.e. controller instructions 150a-150n, for operating the axes 42a-42n.

The second program 143 (lines 01, 02, 03, 04, 05, and the (M−1)-th and M-th lines are illustrated) comprises a plurality of instructions to be executed by the computing device or system, i.e. apparatus instructions 160a-160m, for operating the apparatus 50. It also comprises the controller instructions 150a-150n of the first program 142 but in the form of comments 151a-151n.

In some embodiments, each time the controller 30 runs a controller instruction 150a-150n, the computing device or system 20 runs any apparatus instruction that is in the line of the second program 143 that comprises said controller instruction (but as a comment). By way of example, when the controller 30 runs the controller instruction 150b of line 02 of the first program 142, the computing device or system 20 runs the apparatus instruction 160b of line 03 of the second program 143 since that line includes the same controller instruction 150b, but as a comment 151b.

In some of these embodiments and in some other embodiments, each time the controller 30 finishes running a controller instruction 150a-150n, the computing device or system 20 runs any apparatus instruction that is present in the line(s) of the second program 143 subsequent to the line of the second program 143 that has said controller instruction, as long as the line(s) subsequent do not include any controller instructions 150a-150n. By way of example, when the controller 30 finishes running the controller instruction 150b of line 02 of the first program 142, the computing device or system 20 checks the line or lines posterior to line 03 of the second program 143 (which is the one that has said controller instruction 151b); line 04 has an apparatus instruction 160c and no controller instruction, whereas line 05 has a controller instruction 151c, so the computing device or system 20 stops checking any further lines and thus the computing device or system 20 runs the apparatus instruction 160c of line 04.

In some embodiments, each time the controller 30 is about to start running the first program 142, the computing device or system 20 runs any apparatus instruction that is present in any line(s) of the second program 143 before a line of the second program 143 that has a first controller instruction. By way of example, when the controller 30 is about to start to run the first program 142, the computing device or system 20 checks the first line(s) of the second program 143 to run any apparatus instruction(s) up to the line of the second program 143 that has the first controller instruction 151a; in this case, the computing device or system 20 runs the apparatus instruction 160a of line 01, and does not run any other until the controller 30 has executed the first program 142 because line 02 has the first controller instruction 151a.

The computing device or system 20 may determine what is the current status of execution of the first program by matching data indicative of the position (and, possibly, speed) of the axes with the controller instructions 151a-151n in the second program 143, or by matching the current line of the first program 142 being executed by the controller 30 with the corresponding line of the second program 143 if the controller 30 provides data indicative of the line of the first program 142 currently executed. In the latter case, the computing device or system 20 may match the line number of the first program 142 with the line number of the second program 143 by counting the number of controller instructions 151a-151n in the second program 143. By way of example, if the controller 30 is executing the controller instruction 150d of line 04, the computing device or system 20 finds the line of the fourth controller instruction in the second program 143, which is the corresponding line.

In the present disclosure, the computing device or system (for example, but without limitation, the computing device 10 of FIGS. 1-2 and 7) may be a single device, i.e. a computing device; or it may be a plurality of computing devices that are communicatively coupled, i.e. a computing system, each of which carries out one or more computing operations, or all computing devices carry out one or more computing operations in a distributed manner. Further, the computer program product may be run on a same computing device, or be run in distributed manner between different computing devices. The computer program product may be embodied, for example but without limitation, on a computer-readable medium.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A method for operating a machine, the machine comprising moveable axes and an apparatus for emitting an energy beam, the method including the following steps:
   providing a computing device or system,
   providing, by the computing device or system, a program for operating the axes of the machine based on a Computer-Aided Design, CAD, file, the program comprising a plurality of controller instructions for operating the axes,
   providing the program to a controller of the machine,
   adding, by the computing device or system, a plurality of apparatus instructions to the program,
      each apparatus instruction indicating an energy beam radiation configuration of a plurality of energy beam radiation configurations for the apparatus, and
   each time the controller runs a line of the program that has an apparatus instruction,
      the computing device or system operates the apparatus according to the apparatus instruction,
   wherein each apparatus instruction added to the program is a comment for the controller, and
   wherein each configuration of the plurality of configurations comprises a scanning pattern, one or more scanning speeds, and one or more of: a size of the spot of the energy beam, a power of the energy beam, and a power distribution within the energy beam.

2. The method of claim 1, further comprising receiving, at the computing device or system, at least one of:
   first data at least indicative of position of the axes, the first data being received from sensors of the machine or from the controller; and
   second data indicative of execution of the program by the controller, the second data being received from the controller.

3. The method of claim 2, wherein the first data is further indicative of speed of the axes.

4. The method of claim 1, further comprising at least one of:
   storing the plurality of configurations for the apparatus in the computing device or system; and
   receiving, at the computing device or system from a device or system different from the computing device or system, a configuration for the apparatus according to an apparatus instruction, and modifying, by the computing device or system, the configuration of the apparatus according to the received configuration for the apparatus.

5. The method of claim 1, wherein a post-processor of the computing device or system provides the program with the plurality of controller instructions and the plurality of apparatus instructions.

6. The method of claim 1, wherein the computing device or system comprises: a program generating unit for providing the program; a data transmission and reception unit for transmitting data; and an apparatus controlling unit.

7. The method of claim 1, wherein the computing device or system further adds to the program the plurality of configurations as comments for the controller.

8. The method of claim 1, wherein the apparatus is a laser apparatus and the energy beam is a laser beam.

9. A system for operating a machine, the machine comprising moveable axes and an apparatus for emitting an energy beam, the system comprising:
   a computing device or system comprising:
      a program generating unit configured to provide a program for operating the axes of the machine based on a Computer-Aided Design, CAD, file, the program comprising a plurality of controller instructions for operating the axes;
      a data transmission and reception unit; and
      an apparatus controlling unit configured to process the program;
      the program generating unit is further configured to add a plurality of apparatus instructions to the program, each apparatus instruction indicating an energy beam radiation configuration of a plurality of energy beam radiation configurations for the apparatus;
      the apparatus controlling unit is further configured to operate the apparatus each time a controller of the machine runs a line of the program that has an apparatus instruction (160a-160m), the apparatus controlling unit operating the apparatus according to the apparatus instruction;
      each apparatus instruction added to the program is a comment for the controller; and each configuration of the plurality of configurations comprises a scanning pattern, one or more scanning speeds, and one or more of: a size of the spot of the energy beam, a power of the energy beam, and a power distribution within the energy beam.

10. The system of claim 9, wherein the data transmission and reception unit is configured to receive at least one of:
first data indicative of execution of the program by the controller, the first data being received from the controller and
second data at least indicative of position of the axes, the second data being received from sensors of the machine or from the controller.

11. The system of claim 10, wherein the second data is further indicative of speed of the axes.

12. The system of claim 9, further comprising at least one of the controller and the apparatus.

13. The system of claim 9, further comprising the machine.

14. The system of claim 9, further comprising a storage unit configured to store the plurality of configurations for the apparatus.

15. The system of claim 9, wherein the computing device or system further comprises a computer-aided design introduction unit for generating a CAD file.

16. A non-transitory computer-readable storage medium comprising instructions which, when executed by a computing device or system, cause the computing device or system to perform the following steps:
storing, in the computing device or system, a plurality of energy beam radiation configurations for an apparatus of a machine, the apparatus being configured to provide an energy beam,
adding a plurality of apparatus instructions to a program with a plurality of controller instructions for operating axes of the machine, each apparatus instruction indicating an energy beam radiation configuration of the plurality of energy beam radiation configurations for the apparatus, and
modifying an operation of the apparatus each time a controller of the machine runs a line of the program that has an apparatus instruction, the operation of the apparatus being modified according to the apparatus instruction,
wherein each apparatus instruction added to the program is a comment for the controller, and
wherein each configuration of the plurality of configurations comprises a scanning pattern, one or more scanning speeds, and one or more of: a size of the spot of the energy beam, a power of the energy beam, and a power distribution within the energy beam.

17. The non-transitory computer-readable storage medium of claim 16, wherein the instructions further cause the computing device or system to perform the step of receiving at least one of:
first data at least indicative of position of the axes, the first data being received from sensors of the machine or from the controller; and
second data indicative of execution of the program by the controller, the second data being received from the controller.

18. The non-transitory computer-readable storage medium of claim 17, wherein the instructions cause the computing device or system to receive and use both the first data and the second data when the computing device or system modifies the operation of the apparatus according to the apparatus instructions of the program.

19. The non-transitory computer-readable storage medium of claim 16, wherein the instructions further cause the computing device or system to perform the step of providing the program with the plurality of controller instructions for operating the axes of the machine based on a CAD file.

20. The non-transitory computer-readable storage medium of claim 16, wherein the instructions further cause the computing device or system to perform at least one of:
storing the plurality of configurations for the apparatus in the computing device or system; and
receiving, at the computing device or system from a device or system different from the computing device or system, a configuration for the apparatus according to an apparatus instruction, and modifying, by the computing device or system, the configuration of the apparatus according to the received configuration for the apparatus.

* * * * *